United States Patent [19]

VanVlack

[11] Patent Number: 4,797,132
[45] Date of Patent: Jan. 10, 1989

[54] GAS CONTROL APPARATUS

[76] Inventor: Edward E. VanVlack, 1627 Maple, Myrtle Point, Oreg. 97458

[21] Appl. No.: 70,584

[22] Filed: Jul. 7, 1987

[51] Int. Cl.$^4$ ............................................. B01D 53/14
[52] U.S. Cl. ...................................... 55/227; 55/256; 261/122
[58] Field of Search .................... 55/95, 165, 169, 256, 55/227; 261/123, 122

[56] References Cited

U.S. PATENT DOCUMENTS

| | | | |
|---|---|---|---|
| 3,827,216 | 8/1974 | Mare | 55/95 |
| 3,885,938 | 5/1975 | Scheever | 55/196 |
| 4,300,924 | 11/1981 | Coyle | 261/123 X |
| 4,482,524 | 11/1984 | Handison | 55/256 X |
| 4,545,945 | 10/1985 | Prave et al. | 261/123 X |
| 4,556,523 | 12/1985 | Lecoffre et al. | 261/123 |
| 4,569,757 | 11/1986 | Moore | 261/123 X |

Primary Examiner—Charles Hart
Attorney, Agent, or Firm—Charles N. Hilke

[57] ABSTRACT

A gas control apparatus, designed primarily for sewage treatment plants, comprising a large central storage tank containing water with a fluid inlet and a fluid outlet, a gas inlet under pressure a gas flow unit containing in part a baffle with holes, a gas outlet, and a safety outlet venting to the atmosphere. By adjustment of the fluid outlet, a constant water level is maintained to provide constant back pressure. By adjustment of safety depth outlet, the pressure at which the gas is vented to atmosphere is controlled. Specifically, the gas control apparatus performs five functions: (1) limits back pressure, (2) acts as a flameback trap, (3) eliminates fluid vapor and other soluble impurities from the gas, (4) cools the gas to fluid temperature, and (5) protect system from high pressure caused by blockage either before or after the apparatus.

3 Claims, 2 Drawing Sheets

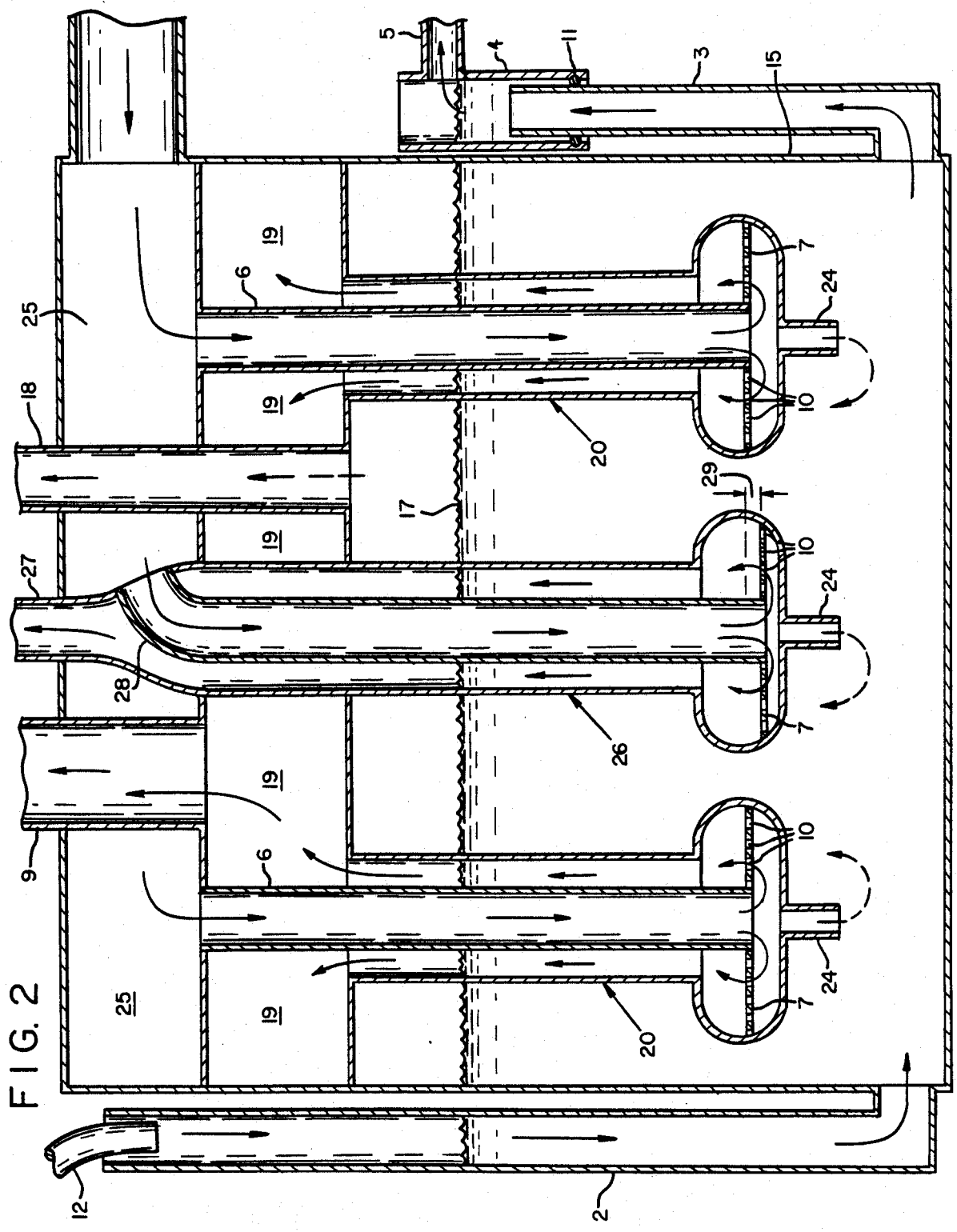

GAS CONTROL APPARATUS

BACKGROUND OF THE INVENTION

In many sewage plants, the waste materials are processed through a digester from which one of the by-products produced is a gas, under pressure, primarily methane. Various pressure regulating devices have been used in the past but, because of corrosion, require a complete overhaul every thirty days. Generally, the previous devices have been large, complex mechanical devices.

While separate mechanical devices can perform the various functions of this invention, none operate as efficiently, inexpensively, elegantly and simply.

In my prior application, Ser. No. 394,127, now abandoned, I've provided a means to control back pressure. The nearest prior art for similar apparatuses was contained in U.S. Pat. Nos. 933,966; 2,584,450; and 3,971,642.

It is an object of this invention to limit the back pressure on the digester to approximately eight ounces or a six inch column of water.

A further object is to vent to atmosphere if blockage occurs after the apparatus while maintaining the safety features for devices before the apparatus.

A further object is to act as a flameback trap to protect the digestor from explosion.

Another object is to eliminate water vapor and other soluble impurities from the gas produced in the digester.

Additionally, it is an object to cool the gas making combustion less likely and less volatile.

A further object is to protect the sewage system as a fail safe for high pressure if the line to the burner is blocked.

Another further object is to reduce the cost of a sewage treatment plant.

It is an object to replace several complex, mechanical systems with a single simplified system.

It is an object to provide a regulator for a waste burner within a single gas control apparatus.

Finally, it is an object to provide a means for capturing the methane gas for commercial or municipal use, thus further reducing costs of operation.

SUMMARY OF INVENTION

The gas control apparatus comprises a gas collection chamber within a large tank filled with fluid, generally water. The fluid level is adjustable. A separate safety outlet is provided in order to vent to atmosphere. Under normal operating procedures, the gas flows through the inlet and by pressure flows under the baffle where baffle holes break the gas into small bubbles which then flow through the water to the gas collection chamber. The gas collection chamber then feeds the gas outlet for downstream use of the gas. A safety depth outlet is provided at the bottom of the gas collection chamber and is made adjustable so that if blockage occurs in the gas outlet, the gas from the gas inlet will flow through the safety depth outlet and then bubble to the surface and vent to atmosphere through the safety outlet. Furthermore, a waste burner regulator is provided where the baffle is lowered to provide a waste burner pressure differential.

BRIEF DESCRIPTION OF THE DRAWINGS

So that the invention may be readily understood, reference is made to the following drawings:

FIG. 2 is a cross-section of multiple unit gas control apparatus.

DETAILED DESCRIPTION OF THE PREFERRED EMBODIMENT

Figure 1:
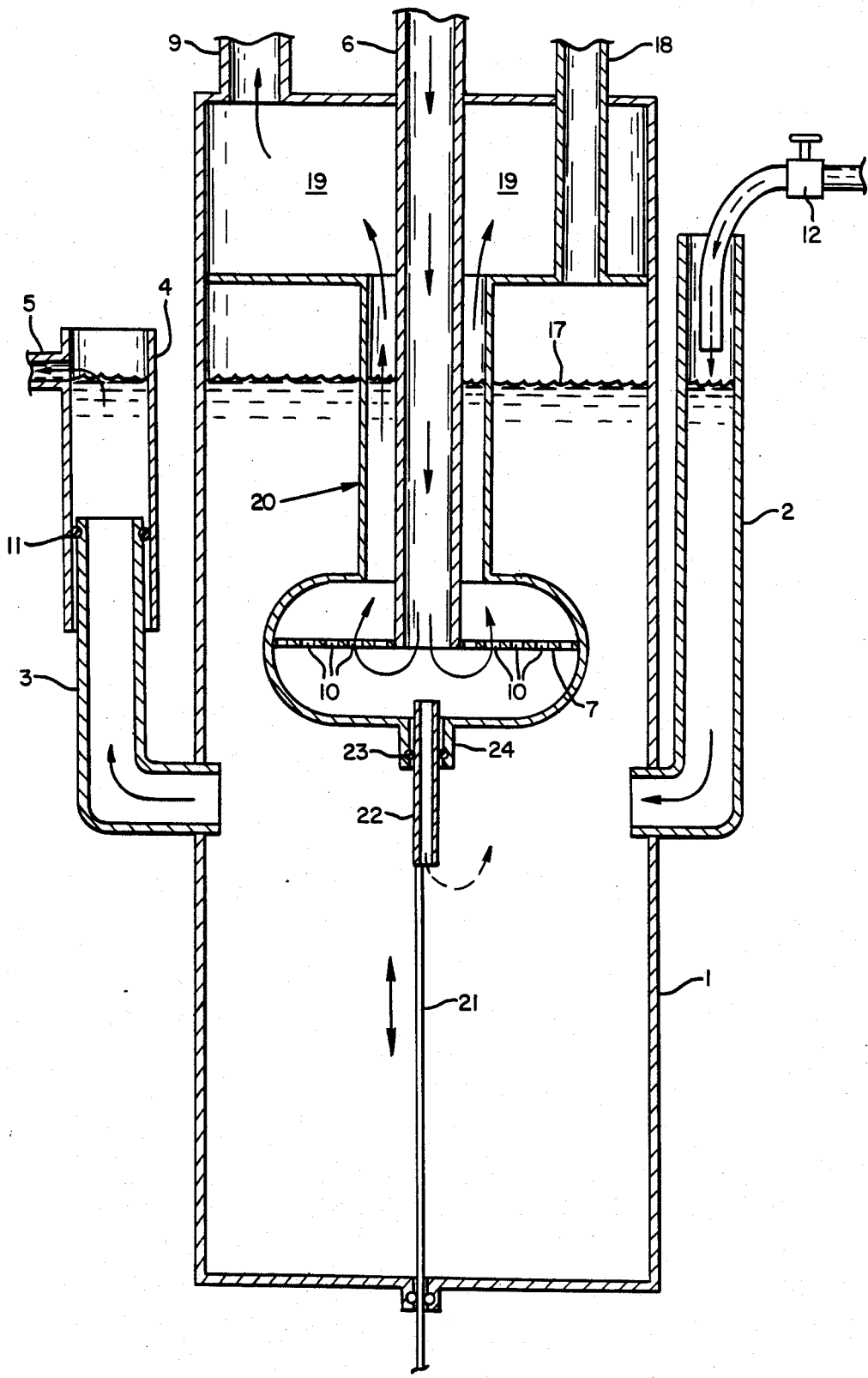
FIG. 1 is a cross-section of the gas control apparatus.

Beginning with FIG. 1, to the tank 1 is connected the fluid inlet 2, the fluid outlet 3, the gas inlet 6, the gas outlet 9, and the safety outlet 18. The fluid outlet 3 has an adjustable top portion 4 containing an overflow opening 5. The baffle 7 is connected to the base of the gas inlet 6 and to the gas flow unit 20. The baffle 7 contains a plurality of small holes 10, preferably ¼ inch diameter and spaced one inch apart, for the purpose of breaking up the gas into small bubbles. The tank 1 is filled with fluid 17, preferably water. The fluid source 12 provides fluid 17 as needed though fluid inlet 2. An O-ring 11 provides a seal between the fluid outlet 3 and the adjustable top portion 4. At the bottom of the gas flow unit 20 is a fixed safety pipe 24 within which a safety depth outlet 22 is adjustable. An adjustment rod 21 is fixed to the safety depth outlet 22 and through the tank 1. The safety adjustment ring 23 allows the safety depth outlet 22 to slide within the fixed safety pipe 24. The gas collects in the gas collection chamber 19 after passing through the gas flow unit 20.

FIG. 2 shows a cross-section view of the multi-unit gas control apparatus with tank 15. This embodiment shows two gas flow units 20 and a waste burner regulator 26. The baffle 7 in waste burner 26 is lowered by an amount identified as the waste burner differential 29. Because multiple gas inlet 6 are used, it is necessary to have a gas input chamber 25. On the waste burner regulator 26 a waste burner inlet 28 communicates between the gas inlet 6 and the gas input chamber 25 within the waste burner outlet 27.

In operation the tank 1 is partially filled with water 17 so that the desired pressure of water is measured and maintained. This is accomplished by moving the adjustable top portion 4 up or down to control the height of the overflow opening 5. The tank 1 is filled through the fluid inlet 2 by means of a fluid source 12. The fluid 17 flows through the safety depth outlet 22 into the gas flow unit 20 and up the gas inlet 6. During operation the fluid source 1 continuously adds small amounts of fluid to the tank 1.

The gas inlet 6 is connected to a digester (not shown) from which gas flows under pressure. The pressure is sufficient to force the gas through the gas inlet 6 and under the baffle 7. The gas is broken into small bubbles when passing through the plurality holes 10 in the baffle 7. The purified gas reaches the gas collection chamber 19 passing through the fluid 17 located between the outside of gas inlet 6 but within gas flow unit 20. The gas then flows through the gas outlet 9 which may be connected to storage units (not shown) capturing the gas for later use. The safety depth outlet 22 located within fixed safety pipe 24 at the bottom of gas flow unit 20 compensates for back pressure that, for example, a furnace may require in order to operate. Additionally, the adjustable safety depth outlet 22 assures a steady gas flow to the furnace or whatever other element the gas is used for.

FIG. 2 shows another embodiment which may be used for large plants. Several gas inlets 6 and gas outlets 9 in a larger tank 15 are provided. However, only one safety outlet 18, though of increased size, is necessary. Baffles 7 of the same design are used in this embodiment. The gas flowing from a large digester or several digesters (not shown) is simply directed through the several gas inlets 6 where the baffles 7 break up the gas in small bubbles. The purified gas then flows through the gas flow unit 20 to the gas collection chamber 19 and out the gas outlets 9 for collection and storage. Fluid levels are maintained by the fluid outlet 3 as described in the previous embodiment. As can readily be seen, this embodiment may be sized to the plant.

While the invention has been described by means of a specific example and in specific embodiments, I do not wish to be limited thereto, for obvious modifications will occur to those skilled in the art without departing from the spirit and scope of the invention.

I claim:

1. A gas control apparatus comprising:
   a. a tank with liquid into which a fluid inlet and a fluid outlet communicates;
   b. at least one gas flow unit within said tank immersed in said liquid where a gas inlet communicates to said gas flow unit and a gas outlet communicates from said gas flow unit and where a baffle with holes connects the base of said gas inlet to said gas flow unit;
   c. a fixed safety pipe fixeably attached to the base of said gas flow unit where an adjustable safety depth outlet is contained within said fixed safety pipe; and
   d. a safety outlet communicating said tank to the atmosphere.

2. The gas control apparatus of claim 1 additionally comprising:
   e. at least one waste burner regulator within said tank immersed in said fluid where a waste burner inlet communicates to said gas inlet and to said waste burner regulator and where a waste burner outlet communicates to said waste burner regulator and where a baffle with holes connects the base of said waste burner inlet to said waste burner regulator.

3. The gas control apparatus of claim 2 where said baffle within said waste burner regulator is positioned lower in said tank than said baffle within said gas flow unit.

* * * * *